US006773217B2

(12) United States Patent
Sinsel et al.

(10) Patent No.: US 6,773,217 B2
(45) Date of Patent: Aug. 10, 2004

(54) POLYMERIC COATING FORMULATIONS AND STEEL SUBSTRATE COMPOSITES

(75) Inventors: John A. Sinsel, Weirton, WV (US); Mark V. Loen, Steubenville, OH (US); Michael S. Bailey, Landenberg, PA (US)

(73) Assignee: Weirton Steel Corporation, Weirton, WV (US)

( * ) Notice: Subject to any disclaimer, the term of this patent is extended or adjusted under 35 U.S.C. 154(b) by 196 days.

(21) Appl. No.: 10/208,454

(22) Filed: Jul. 30, 2002

(65) Prior Publication Data

US 2004/0022604 A1 Feb. 5, 2004

(51) Int. Cl.[7] .......................... B21D 51/26; B32B 15/08

(52) U.S. Cl. ........................... 413/1; 428/461; 428/458; 428/332; 205/154; 205/300; 156/244.11; 264/171.21

(58) Field of Search ..................... 413/1, 3, 8; 205/140, 205/154, 300, 302; 428/332, 461, 458, 463; 156/244.11, 244.23, 244.24; 264/171.21

(56) References Cited

U.S. PATENT DOCUMENTS 4,446,156 A * 5/1984 Salm .......................... 428/648
5,628,893 A * 5/1997 Opaskar ..................... 205/300
5,928,487 A * 7/1999 Sinsel et al. ................ 205/300
6,280,596 B1 * 8/2001 Wilkerson et al. .......... 205/140

* cited by examiner

*Primary Examiner*—Allen Ostrager
*Assistant Examiner*—Jimmy T Nguyen
(74) *Attorney, Agent, or Firm*—Shanley and Baker

(57) ABSTRACT

Flat-rolled steel strip, free of surface iron oxide, is provided with a corrosion-protection metallic coating on both surfaces, followed by continuous-line polymeric coating operations in which a single surface is pre-treated so as to activate that surface for adhesion of molten extruded thin-film polymeric material for in-line travel. Polymeric materials are formulated to provide maleic-anhydride modified polypropylene, which is melted and pressurized for extrusion as a molten thin-film tie-layer for first contacting that activated surface; and, thin-film intermediate and finish layers are each formulated to contain a selected percentage of polybutylene; which are extruded as molten films in overlaying relationship to said first contacting tie-layer. Polymeric finish-processing re-melts the polymeric materials; and, following a selected interval of in-line travel in that re-melted condition, rapidly cools those polymeric materials through glass-transition temperature so as to establish amorphous characteristics throughout said materials. End-usage product comprise flat-rolled mild steel can stock for fabricating one-piece drawn, and drawn and ironed, can bodies with interior polymeric coating and an exterior corrosive-protection metal coating, such as matte-finish electrolytic tin plate.

17 Claims, 6 Drawing Sheets

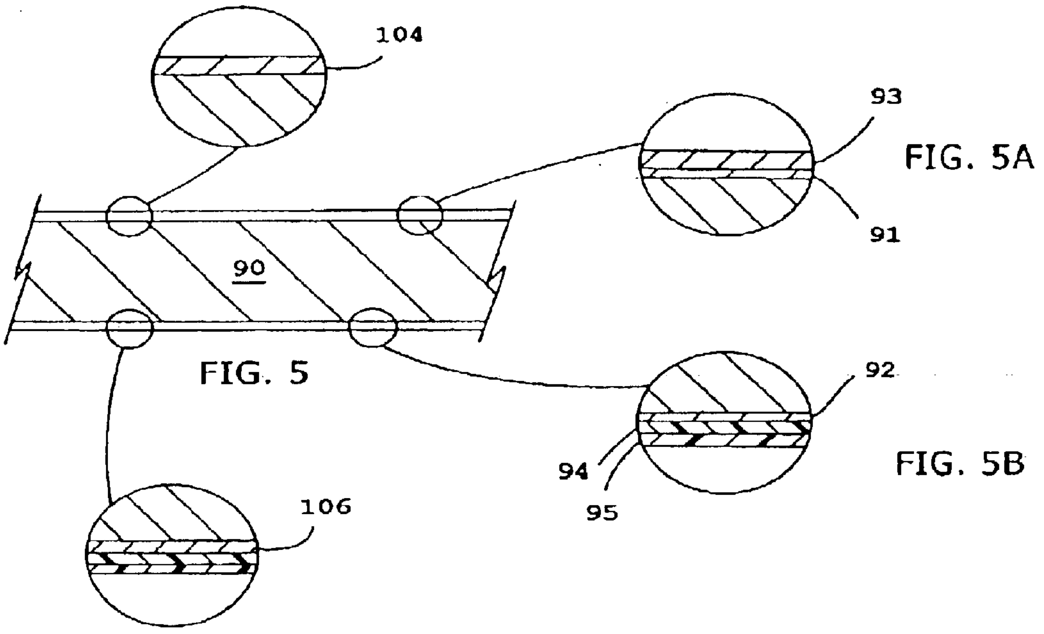
FIG. 5C
104
93
FIG. 5A
91
90
FIG. 5
92
94
FIG. 5B
95
106
FIG. 5D
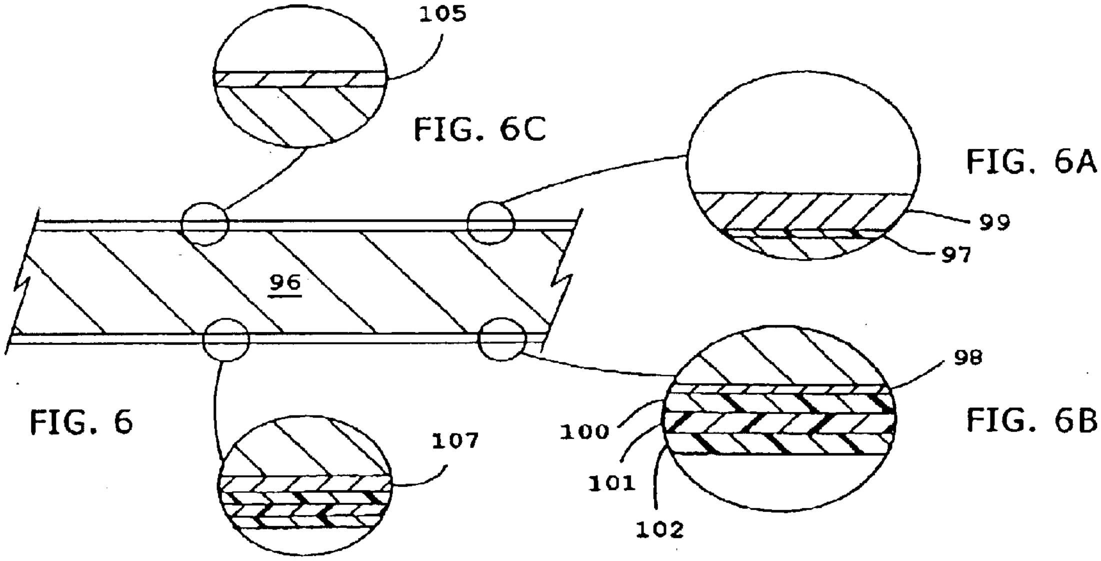
105
FIG. 6C
FIG. 6A
99
97
96
98
FIG. 6
100
FIG. 6B
107
101
102
FIG. 6D

POLYMERIC COATING FORMULATIONS AND STEEL SUBSTRATE COMPOSITES

INTRODUCTION

This invention relates to methods and apparatus for manufacturing composites combining thermoplastic polymers and rigid sheet metal, in particular, for fabricating rigid flat-rolled mild steel can components; and, more specifically, is concerned with combining selected polymeric formulations which facilitate fabricating pre-coated mild steel substrate into one-piece rigid can bodies, including beverage can bodies having what is referred to as ironed side walls.

OBJECTS OF THE INVENTION

An important object involves analyzing established practices which have limited polymeric coating of the interior of a one-piece drawn and ironed beverage can body to processes which are carried out after fabricating of that can body.

A related object is to enable combining polymers and flat-rolled mild steel to improve manufacturing, fabricating, and content shelf-life when using rigid one-piece can components for canning comestibles; and, in particular, improving shelf-life when using ironed-sidewall can bodies for canning acidified contents, including carbonated beverages, fruit juices, tea, and the like.

Further objects include embodiments with differing polymeric coating formulations and pre-coating method embodiments for combining with flat-rolled mild-steel substrate, so as to enable:

(i) increased manufacture of composite work-product, and (ii) safer fabricating of can components utilizing those composite work-products.

A specific object is to enable polymeric pre-coating of a single-surface of corrosion-protected flat-rolled mild steel so as:

(i) to enhance can component fabrication, and (ii) to increase shelf-life of cans utilizing rigid flat-rolled steel one-piece can bodies, including cans utilizing ironed-sidewall rigid one-piece can bodies.

A related object is enabling fabrication of polymeric pre-coated flat-rolled mild steel one-piece rigid can bodies, free of a requirement for post-fabricating polymer coating, or post-fabricating polymer coating repair.

Other objects and contributions are considered during the following more detailed description of the invention.

BRIEF DESCRIPTION OF THE DRAWINGS

FIG. 5 is an enlarged cross-sectional view of composite work-product, with associated further-expanded views, in FIGS. 5(A), 5(B), 5(C) and 5(D) for describing corrosion-protective two-polymeric layer embodiments of the invention; and FIG. 6 is an enlarged cross-sectional view of composite work-product, with associated further-expanded views in FIGS. 6(A), 6(B), 6(C) and 6(D) for describing corrosion-protective three-polymeric layer embodiments of the invention.

DETAILED DESCRIPTION OF THE DRAWINGS

Figure 1:
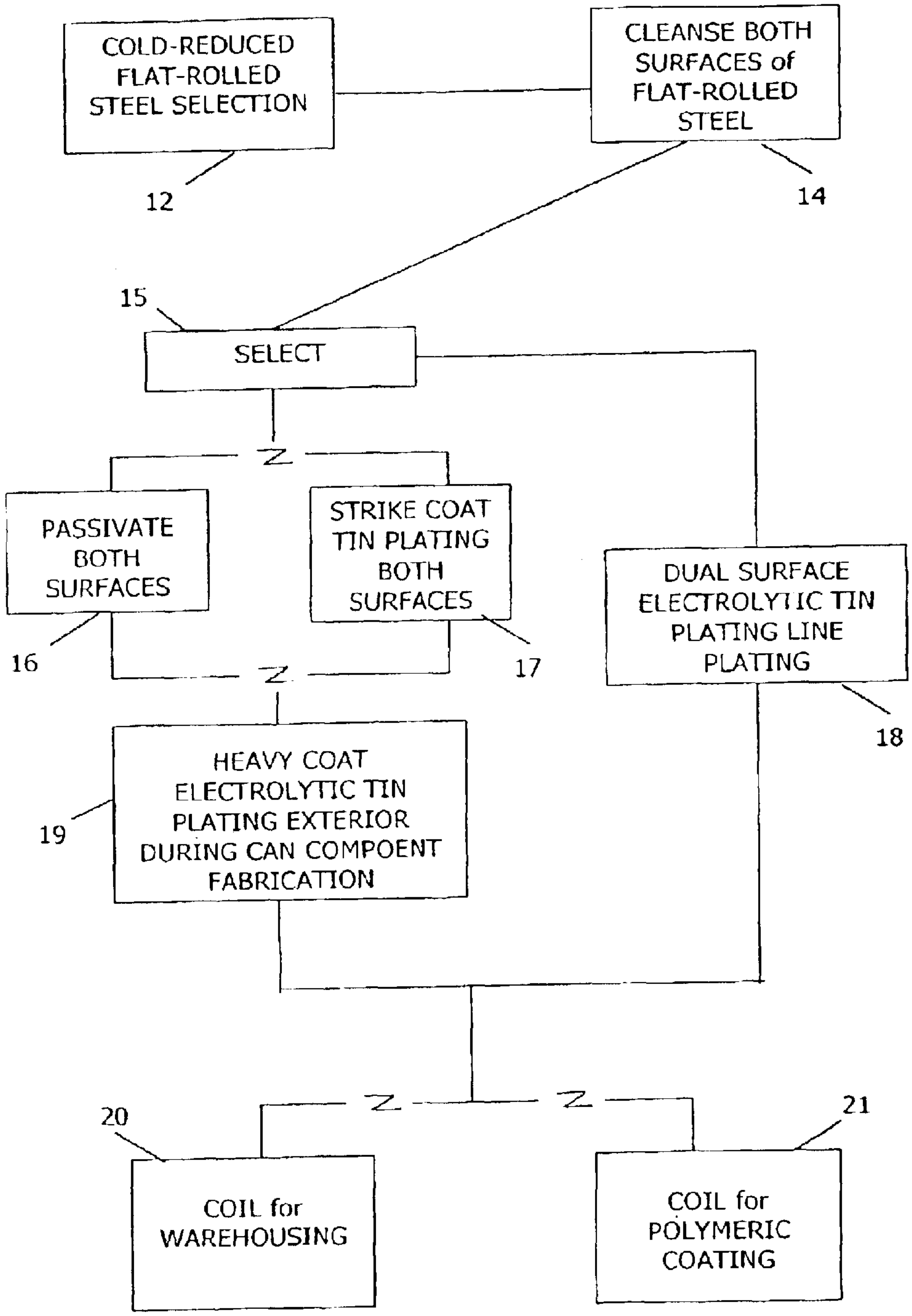
FIG. 1 is a diagrammatic presentation for describing selection and corrosion-protection processing of flat-rolled mild steel in carrying out the invention.

Fabricating rigid sheet metal can components, such as one-piece can bodies and end closures, so as to be free of a requirement for post-fabricating polymeric coating or for post-fabricating polymeric coating repair. Also, can makers and can packing companies confront requirements of the U.S. Food and Drug Administration (FDA), and/or the U.S. Department of Agriculture for canning comestibles; and, are concerned with providing a reasonably-extended shelf-life as expected when using rigid sheet metal canning; which, in turn, is related to a concern for maintaining the quality of canned comestibles.

Those canning requirements become of particular concern when using rigid sheet metal one-piece "ironed-sidewall" can bodies. "Ironing" to elongate the sidewall of a unitary rigid sheet metal can body is often referred to as "cold" forging. However, "forging" is customarily used to describe shaping metal after the metal has been made more plastic by heating. Therefore, there has been little consensus on "cold-forging" as sheet metal technology for canmaking; and, little agreement in attempting to describe sidewall ironing of high tensile-strength metals such as flat-rolled mild steel can stock.

Regardless of those aspects, polymer pre-coating of rigid flat-rolled sheet metal can stock for "sidewall ironing" has been significantly restricted. More specifically, polymeric pre-coating prior to "sidewall ironing" of rigid aluminum one-piece can bodies has been precluded in the numerically-dominant U.S. rigid can market for beverages.

Sidewall "ironing" of a one-piece can body for that market uses apparatus referred to as a "body maker"; in which a relatively-shallow one-piece metal cup, formed from relatively low tensile strength alloy-free aluminum, is forced through cylindrical cross-section ironing rings which gradually decrease in diameter resulting in elongating the can body sidewall.

That drawing and ironing (D&I) prior practice requires continuous flushing during ironing, using a difficult to remove synthetic coolant/lubricant. The resulting "ironed sidewall" can body must be throughly washed and rinsed, usually repeatedly; and, throughly dried, before attempting any can body interior polymer protection. That is, polymeric pre-coating of sheet metal work product has been avoided in that predominant U.S. can market, prior to present teachings.

Polymer protection of the can body interior in that predominant market has relied on spraying a solvent-based organic resin-type polymer into the dried can body interior. The can body is positioned open-end down and the interior is spray coated with an organic resin, as dissolved in a volatile solvent, or solvents. Curing of that interior coating is generally required; and, driving off solvent(s) is required.

Spray coating of a pressurized solvent-based organic coating into an "open-end down" can body can entrap gas. Gas entrapment, whether occurring as a result of interior spraying of an open-end-down can body; or, occurring when attempting to drive off the solvent(s), can ultimately result in one or more pin holes in the sprayed coating. If that occurs shelf-life can be decreased since aluminum dissolving through a single such pin hole can be detrimental to content quality; and, acidified liquid contents tend to increase such dissolution.

Corrosion-protection of flat-rolled mild steel, selected polymeric formulations, and method steps for polymeric pre-coating of steel, as described herein, provide increased adhesion eliminating those detriments of the prior practice; and, facilitate composite work product manufacture and can component fabrication, so as to increase shelf-life and quality of canned comestibles.

FIG. 1 is presented for describing selecting flat-rolled mild steel can stock, corrosion-protection of that steel, enhancing production of flat-rolled mild steel/polymeric composite work-product and fabricating of extended shelf-life end-usage can components. At Station 12, "clean" steel is selected; that is: inclusion of non-metallic materials, such as particulate from refractories used in the lining of steel furnaces, is controlled. Non-metallic particulate of a size approaching a minimum thickness, at any portion of an end-usage can component, is eliminated. Molten steel ladle practice, and continuous-casting practice, have been well developed and established for producing "clean" mild-steel can stock which is substantially-free of non-metallic inclusions capable of interfering with fabrication of can components.

Mild steel, also referred to as low-carbon steel, contains a maximum of about 0.025% carbon and minor percentages of manganese, silicon and some residuals of sulphur, phosphorus or other elements. Mild steel, as selected herein, provides a significantly-useful range of mechanical-usage properties; for example: tensile-strength, temper, and ductility. At Station 12, the type of cold-reduced flat-rolled mild steel is selected to include single-reduced (SR T-4,5) with a tensile strength of about forty to fifty KSI; or, double-reduced (DR T-8,9) with a tensile strength of about eighty to about one hundred and ten KSI. A thickness gage is selected in the range of above about fifty five to about one hundred and thirty five pounds per base box (about 0.006" to about 0.015").

At Station 14 of FIG. 1, both opposed substantially-planar surfaces of the selected flat-rolled steel strip are cleansed to remove cold-rolling debris, in preparation for corrosion-protection of opposed surfaces of the steel substrate.

Station 15 provides for selection or combining metallic subsurface corrosion-protection embodiments for planar surfaces of the steel substrate; and, also, for selecting tin plating embodiments for external protection of end-usage can components. In one initial corrosion protection embodiment, carried out at Station 16, both cleansed surfaces are passivated by cathodic-dichromate treatment, either by bath immersion treatment or by cathodic-dichromate electrolytic plating; with coating weights as tabulated later herein. That cathodic-dichromate protective coating is impervious to water, oils, alcohol, and most acids; so as to provide for handling and/or for storing of the strip, as well as providing for subsequent sub-surface protection for the polymer-coated/steel work-product composite, as well as sub-surface surface protection for end-usage product fabricated from that composite.

An added initial corrosion-protective embodiment selection, available at Station 17, consists of a lightweight "strike-coat" or "barrier layer" electrolytic tin plating. That embodiment provides for selection from in-line acid pickling of both surfaces, to remove surface iron oxide as carried out in a pickle/plating bath; that processing is described in co-owned U.S. Pat. No. 5,928,487 entitled "Electrolytic Plating of Steel," issued Jul. 27, 1999 which is included herein by reference. Such pickle/plating bath electrolytic "strike-coat" plating of tin is in the weight range of about 0.02 to about 0.05 pound per base box, on each respective surface (a "base box" is defined in the steel industry as an area of 31,360 square inches).

Another initial corrosion-protection embodiment providing a protective "barrier" layer of electrolytic tin, having a weight of about 0.02 to about 0.05 pound per base box, is carried out by directing the flat-rolled steel into an initial dual-surface electrolytic tin plating cell; such a dual-surface Halogen plating solution cell is described in co-owned U.S. Pat. No. 6,280,596 (B) entitled "Electrolytic Tinplating of Steel Substrate" issued Aug. 28, 2001, which is included herein by reference. Each such tin strike-coat on barrier-layer protects the flat-rolled steel surface for handling purposes in directing the strip for additional in-line electrolytic tin plating; and, further, for later polymeric coating purposes in forming work-product composite; and, also, provides sub-surface protection for fabricated end-usage product.

Direct electrolytic tin plating of both surfaces, can be selected at Station 18 in an embodiment which provides subsurface protection for a single polymeric coated surface; and, substrate protection for the remaining surface, of the composite work product, which is free of polymeric coating. The later comprises the external surface protection for an end-usage can component. Such uniform heavier tin plating weight for each surface is preferably selected at about a quarter-pound (0.25#) per base box per plated surface.

Station 19 enables initial corrosion-protected substrate from Station 16 or Station 17, to be electrolytically tin plated on one surface with a weight in a range from above about a quarter pound per base box to about a pound and a quarter (1.25#) per base box of that plated surface. In carrying out the invention with that embodiment, such heavier tin plating weight is disposed on the surface of the composite work product which will be the exterior of a can body, or other can component, during fabrication of end-usage product from such composite work-product.

A differential tin plating coating weight is provided by combining "strike-coat" or "barrier-layer" initial corrosion-protection plating of both surfaces, from Station 17, with such heavier-coat electrolytic tin plating from Station 19 on that surface which will be free of polymeric coating during composite manufacture by combining flat-rolled mild steel and polymeric coating layers.

Preferably, in practice as taught herein, electrolytic tin plated surfaces remain matte-finish; that is, melting of the tin, after plating, to provide a flow-brightened surface, is not necessary and, the matte-surface tin plating by avoiding tin-iron alloying can contribute can component fabricating advantages; particularly for can body fabrication. Either tin-plated embodiments, from Station 18 or from Station 19, can be coiled for warehousing at Station 20 of FIG. 1; or, can be coiled at Station 21 for delivery for polymeric coating.

Figure 2:
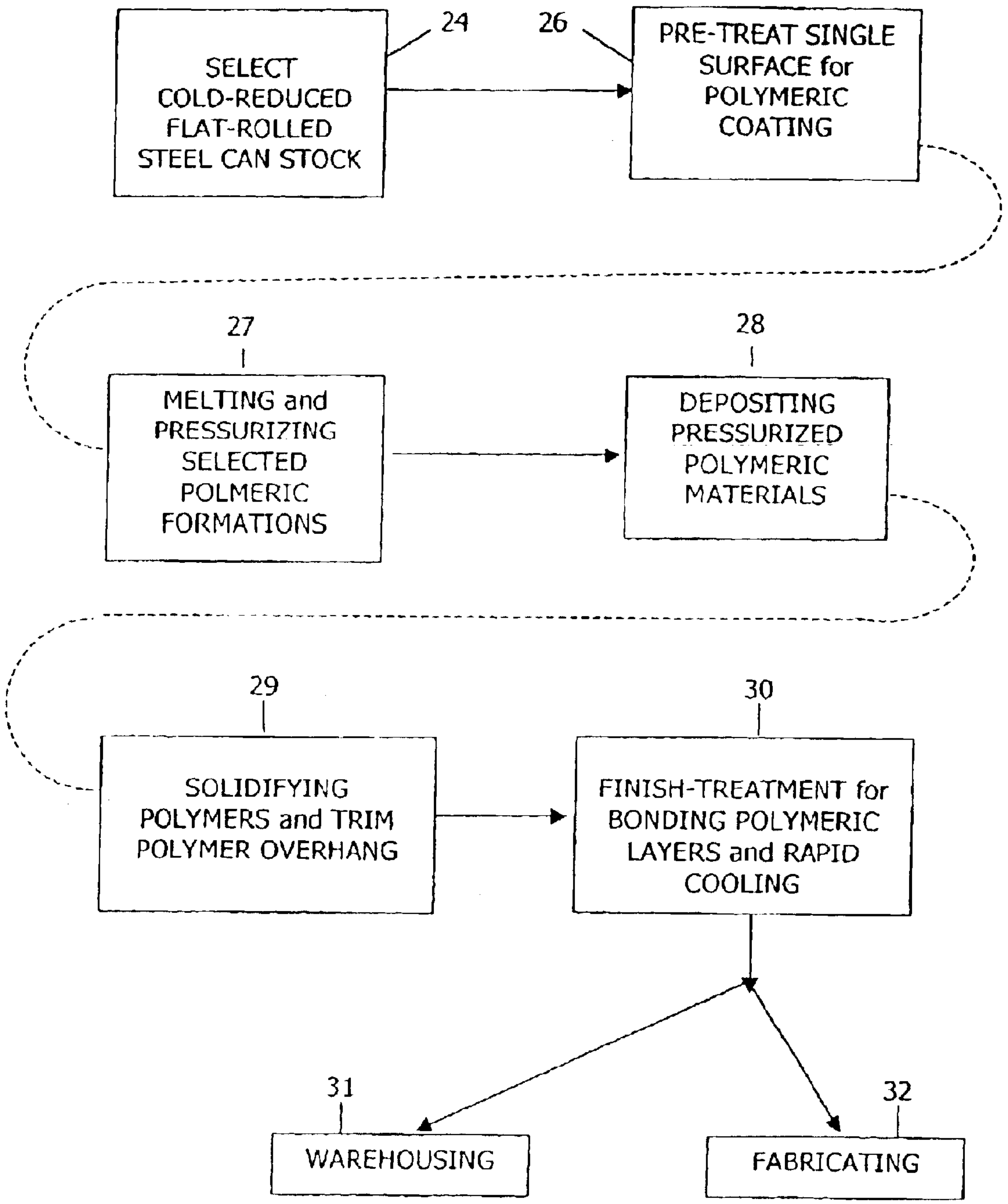
FIG. 2 is a diagrammatic presentation for describing continuous in-line combination of polymeric formulations and corrosion-protected rigid flat-rolled steel substrate in carrying out the invention.
Figure 3:
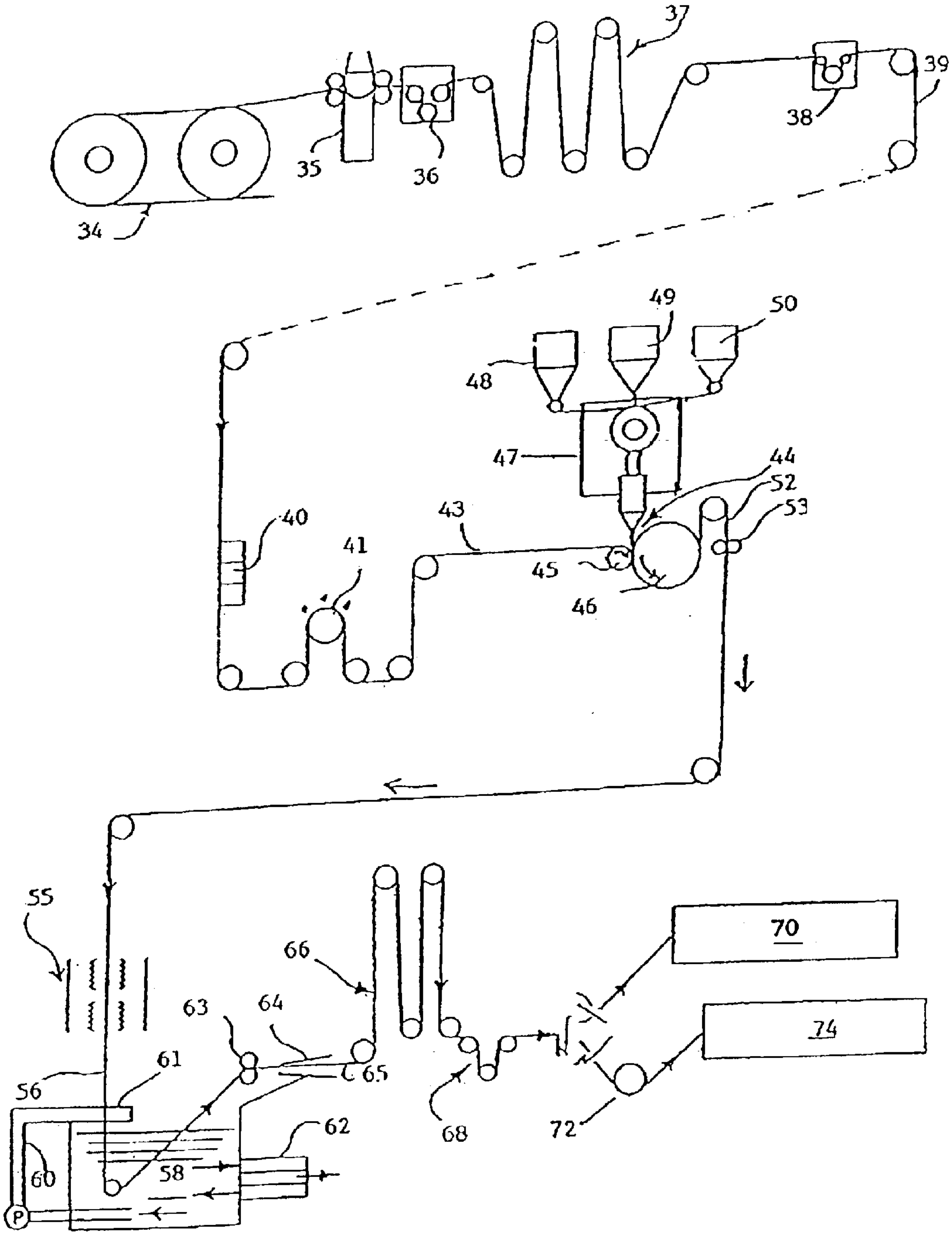
FIG. 3 is a schematic view, partially in cross-section, of continuous-line apparatus for selectively carrying-out extrusion and finishing of polymeric formulations in accordance with the invention.

FIG. 2 is a diagrammatic presentation for describing manufacturing process steps of the invention for producing polymeric coating composite work product; and, the schematic presentation of FIG. 3 is for describing combining apparatus in a continuous-line of the invention, for carrying out polymeric coating process of FIG. 2.

Rigid flat-rolled mild steel continuous strip can stock is selected, at Station 24 of FIG. 2. Clean flat-rolled mild steel substrate is selected from single-reduced tin mill product (SR T4-5) and from double-reduced tin mill product DR TB-9, as described above, for manufacture of polymer/steel composites; and, for fabricating of selected end-usage components.

Foil gages are avoided; rigid flat-rolled can stock is selected for in-line manufacturing purposes and, also, so as to enable fabricating rigid-sheet metal can components. An embodiment of flat-rolled mild steel substrate, protected against corrosion, as disclosed in relation to FIG. 1, is selected at Station 24 prior to extrusion deposition of melted polymeric-coating layers.

The corrosion-protected embodiment selected at Station 18 or Station 19 of FIG. 1 as corrosion-protective flat-rolled mild steel continuous-strip is directed for in-line travel in the direction of its length, presenting opposed substantially-planar surfaces between its lateral edges. The strip travels in-line approximately at ambient temperature of about seventy-five to about one hundred fifty degrees Fahrenheit; that is: heating of the strip is not required for extrusion polymeric coating as disclosed herein.

A single-surface of the strip, for receiving polymeric coating, is pre-treated at Station 26 of FIG. 2. That pre-treatment processing is carried out on the single-surface for receiving polymeric coating. Pretreatment can be selected from the group consisting of:

(i) open flame impingement on such single-surface, which fuel/air ratio of the flame controlled so as to produce an oxidizing reaction on that single surface and augment adhesion and retention of a selected polymeric formulation for melted extrusion coating, (ii) corona discharge (free of electric arcing) ionizes the gaseous atmosphere contacting that single-surface, and also enhances such adhesion, and (iii) any combination of (1) and (ii), in any sequence.

At Station 27 of FIG. 2, polymeric formulation embodiments are provided for selection. In a first embodiment, thermoplastic polymer formulations are selected for two polymeric layers. That is, a polymeric layer which first contacts the single-surface (sometimes referred to herein as a "tie" layer); and, a "finish-surface" external polymeric layer. The polymeric formulation for such tie layer is selected for enhanced adhesion to the pre-treated single surface. That tie layer consists essentially of maleic-anhydride modified polypropylene (PP). Melted contact of that formulation with the pre-treated surface produces a bonding which appears to be chemical in nature; which is exhibited in later fabricating of end-usage product.

The finish-surface polymeric layer, for the two polymeric layer embodiment, is formulated to comprise polybutylene (PB) which provides flexibility for the polymeric coating. The polybutylene (PB) also helps to prevent "crazing", an ultra-fine sub-surface cracking of the polymeric coating, sometimes associated with fabricating stress and which can produce a cloudiness in the polymeric layer.

Formulations of the finish-surface layer of the above-described two layer embodiment, and the three-layer embodiment to be described, can provide a self-lubricating property for that surface. Such self-lubricating properties presented on the polymeric coated interior of a can component facilitate fabrication, in particular, during fabrication of one-piece can body end-usage products.

The polybutylene (PB) of the finish-surface layer of the two-layer embodiment can be formulated by combining an ethylene and polypropylene (in a random copolymer as defined below), a homopolymer polypropylene (PP), and a combination of those two. The polybutylene (PB) in that formulation comprises about five percent, by weight, of that finish-surface layer.

A random copolymer, such as the ethylene/polypropylene random copolymer, referred to above, is defined as a copolymer in which the ethylene molecules are dispersed randomly in relation to the polypropylene (PP) molecules.

An additional polymeric coating embodiment of the invention comprises three polymeric layers, in which an "intermediate" polymeric layer is provided between the "tie" polymeric layer and the "finish-surface" polymeric layer. That intermediate layer, also referred to as a "bulk" layer, includes a combination of polybutylene (PB), and the polypropylenes, as described above for the finish-surface layer. However, the intermediate layer includes an increased percentage of polybutylene (PB). Also, that "bulk" layer is selected to be capable of carrying a colorant, comprising about seven and a half to about fifteen percent titanium dioxide by weight, which provides a white interior, during can component fabrication.

The polymeric formulation for the "bulk" layer of the three-layer embodiment comprises: from about ten to about twenty five percent polybutylene, combined with thermoplastic polymers selected from the group consisting of (i) a homopolymer polypropylene, (ii) an ethylene/polypropylene random copolymer, and (iii) a combination of (i) and (ii).

The finish-surface polymeric layer, for the three polymeric layer embodiment, is formulated as described above and provides polymeric-layer flexibility and self-lubricating properties.

The thermoplastic polymers for the polymeric layers are formulated separately for each layer of the two-layer embodiment and the three-layer embodiment; those separate formulations are melted as provided for extrusion. Such formulations are melted and pressurized for extrusion at Station 27. The temperature selected for extrusion is in a range which extends from above about 350° F. to about 550° F. Each layer is simultaneously extruded under pressure as a distinct polymeric layer when producing the two layer embodiment and when producing the three layer embodiment.

The melted polymeric layers are extruded at Station 28 of FIG. 2 to extend across strip width; and, also are extruded so as to provide polymeric overhang at each lateral edge of the strip during polymeric coating of such pre-treated single-surface. Such extrusion and deposition steps are carried out while the strip is moving in-line, at about ambient temperature, in a range from about seventy five degrees to about one hundred and fifty degrees Fahrenheit.

Solidification of the polymeric layers is initiated upon contact with the ambient temperature strip. In-line solidification is completed at Station 29 by in-line contact with a temperature-modulating surface. Such in-line temperature-modulating surface contact is maintained at a temperature selected in the range of about 150° F. to about 170° F. That selected temperature-modulating temperature provides desired solidification of the polymeric layers and polymeric overhang, enabling continued in-line travel of the strip, coated with solidified polymeric coating, independently of such temperature-modulating surface contact.

After such solidification, the polymeric overhang is trimmed; also at Station 29 of FIG. 2. Trimming solidified lateral overhang at each lateral edge contributes the capability for depositing a uniform polymeric coating thickness across such surface. It was found that thin-film extrusion produce an "edge build-up"; that is, extruding such thin polymeric layers across an extended width was found to produce edge thickening at the lateral edges of the extrusion; and, that extended edge thickness was solidified at each lateral edge of the strip. To eliminated edge build-up on the lateral edges of the strip a polymeric overhang is extruded at each lateral edge of the strip. After solidification, that edge-thickened polymeric overhang is trimmed. That provides the ability to control producing a substantially-uniform thin-film extruded polymeric coating thickness across strip width.

After solidification of the polymeric layers and trimming of the polymeric overhang at each lateral edge at Station 29 of FIG. 2, the strip is directed for completing polymeric finishing treatment. The solidified polymeric layers of a two layer embodiment, or a three layer embodiment, as selected, are finish-treated by melting at Station 30. High-frequency induction heating of the steel substrate is preferred for prompt melting of the selected polymeric layers. Such melting is carried-out while the strip is traveling in-line. Preferably, the heating temperature is limited so as to maintain the desired matte-finish of the electrolytic tin plating.

Induction heating promptly raises the temperature of the strip and, in turn, the polymeric layers, while traveling at a selected line speed, which can extend above about eight hundred feet per minute (fpm) to about twelve hundred fpm. The polymeric layers are melted at Station 30 of FIG. 2 by heating within a temperature range of about 340° F. to less than the melting temperature of tin; which is about 440° F. Such in-line melting facilitates full polymeric coating of the topography of such pre-treated surface, and helps to provide a smooth exterior for the polymeric coating. The bonding strength between the tie layer and the substrate surface, and between the distinct polymeric layers of the selected embodiment, is augmented.

Such in-line melt-finishing processing, in combination with the earlier pressure-roll application, as described in more detail in relation to FIG. 3, help to eliminate gas entrapment in the polymeric coating embodiment, as selected, for such single surface of the composite.

Also, the polymeric layers are rapidly cooled through glass transition temperature at Station 30 of FIG. 2. Such rapid cooling through glass transition temperature, utilizing apparatus as shown in FIG. 3, produces desired amorphous characteristics throughout the polymeric layers, which contribute to desired flexibility of the polymeric coating during fabrication of end-usage products.

Strip-supply coils and handling equipment are arranged at the entry section of FIG. 3 so as to enable continuous-strip polymeric-coating operations. Strip from individual coils, on ramp 34, is directed for welding together, forming continuous-in-line-strip, at Station 35. Bridle rolls at Station 36, looper 37, and bridle rolls at Station 38 facilitate movement and supply of continuous-strip 39 for in-line travel; and, help to maintain desired in-line speed during switching supply coils at entry ramp 34.

Rigid flat-rolled mild-steel continuous-strip 39 travels in-line for pre-treatment of a single surface of the selected, corrosion-protected steel substrate embodiments, as described in relation to FIG. 1. That single-surface selected for polymeric coating is for disposition on the interior of a can component fabricated from the composite work-product being produced. The heavy-coat electrolytic tin plating, as applied at Station 19 of FIG. 1, is to be utilizing on the exterior of a can component. In the embodiment from Station 18 of FIG. 1 one of the dual-surface electrolytic tin plated surfaces from Station 18 of FIG. 1 will be maintained, polymer-free for such exterior use. In each such embodiment the single surface which is pre-treated for polymeric coating is for disposition on the interior of a can component in contact with can contents.

During pre-treatment of that single-surface for polymeric coating, the number of open-flame pre-treatment burners, at burner Station 40 of FIG. 3, is selected based on line speed. Open-flame impingement removes debris from the surface to be polymer coated; and oxygen fuel ratio of such flame is controlled so as to produce an oxidizing reaction on that single-surface in response to impingement of that controlled open-flame. That oxidizing reaction activates the surface for enhanced adhesion of the formulation of tie polymeric coating layer which first-contacts that pre-treated single-surface of strip 39.

Corona discharge unit 41 is controlled to establish an electrical potential, which ionizes gaseous atmosphere contacting the single-surface free of an electric arcing with the strip. That corona-discharge also activates the single-surface so as to enhance polymeric adhesion. The number of such pre-treatment units is selected based on in-line travel-rate of continuous-strip 39. Pre-treatment of such single-surface to be polymeric coated, is selected from the group consisting of solely open-flame treatment, solely corona-discharge treatment, and a combination of those two pre-treatments, so as to achieve desired surface-activation on a single-surface of strip 43.

Continuous strip 43 presents such pre-treated surface for melted polymer extrusion coating, as directed toward coating nip 44; the latter is established by pressure-exerting roll 45 and temperature-modulating roll 46. Melted polymeric layers, of either the two or three layer embodiment as selected, are directed under pressure by extrusion apparatus 47 onto the pre-treated surface as the strip is entering coating nip 44. Roll 45, rotating as shown, exerts pressure so as to eliminate gas entrapment during application of polymeric layers to the pre-treated surface.

The formulations for polymeric layers, as described above, are supplied from sources 48, 49, and 50; in which, each such specified formulation is initially melted. The three-polymeric layer embodiment utilizes the three sources 48, 49 and 50. When producing a composite, with the two polymeric layer embodiment, sources 48 and 50 are utilized; and, source 49 remains inactive.

A maleic-anhydride polypropylene is provided at source 48 for the "tie" layer for first-contacting the strip. A selected finish-surface formulation for the two layer embodiment is provided at source 50. An intermediate (bulk) layer formulation, as used in the three-layer embodiment, if selected, is provided by source 49. Each layer, of the selected two or three layer embodiment, is fed as a distinct polymeric layer. And, each is extruded under pressure by extrusion apparatus 47; such pressurizing augments heating of the polymers.

Strip 43, presenting such pre-treated surface, travels in-line at approximately ambient temperature, that is: in a temperature range of about seventy five to about one hundred and fifty degrees Fahrenheit, for receiving the melted polymeric layers of the selected embodiment, as simultaneously extruded. Pressure roll 45 presents a non-metallic surface, such as Teflon-coated neoprene. Temperature-modulating roll 46 preferably presents a chrome-plated metallic surface. The polymeric coating materials are extruded at a temperature above melt temperature, preferably in a temperature range of 350° F. to about 550° F. The ambient temperature of strip 43 helps to initiate solidification of the polymeric coating; that is, heat from the melted polymeric coating layers promptly moves into the cooler strip.

The finish-surface polymeric coating layer of the multi-layer embodiment, as selected, is extruded as the external layer. Temperature-modulating roll 46 is temperature controlled internally to avoid being heated above a desired temperature by heat extracted by surface-contact with the polymeric coating. Roll 46 is cooled so as to maintain a temperature, preferably in the range of about 150° F. to about 170° F.; for removing heat from the extruded polymeric layers. Surface-contact circumferential travel, with temperature-modulating roll 46 is selected to provide heat extraction, and sufficient solidification of the polymeric coating layers, so as to enable polymeric coated strip 52, to separate from temperature-modulating roll 46, for continuing in-line travel independent of such temperature modulating.

The radius for temperature-modulating roll 46 is selected to provide for such solidification of the polymeric coating, enabling such independent travel of coated strip 52. Preferably, the radius of temperature-modulating roll 46 is selected to provide a circumference enabling such independent travel of polymeric coated strip subsequent to in-line contact with about half the circumferential surface area of rotating temperature-modulating roll 46.

Single-surface polymeric coated strip 52 of FIG. 3, separates from temperature-modulating roll 46, with solidified polymeric coating, for in-line travel. Solidified polymeric overhang is removed from each lateral edge by edge trimmer 53, for continued in-line travel as indicated.

Single-surface polymeric-coated strip 52 of FIG. 3 travels toward polymer-coating "finishing operations" initiated at heating apparatus 55, in which the polymeric coating is melted. Apparatus 55 preferably includes a high-frequency-induction heating unit for heating of the steel strip while traveling at the selected line speed. Induction heating of the strip promptly melts the polymeric coating layers completes bonding together of the individual polymeric layers and, augments bonding of the tie layer with the full area of the surface topography. The external finish-surface polymeric layer provides a smooth finish exterior for either the two-layer or the three-layer embodiment, as selected.

As part of the finishing operations, the polymeric coating on strip 56 of FIG. 3 is then rapidly cooled through glass transition temperature by coolant in quench bath 58. Laminar flow of the coolant, along one or both surfaces of strip 56 can be provided by flow-unit 60. Coolant, from cooler portions of bath 58, is pumped toward laminar-flow-control section 61, for directing laminar-flow contact with traveling strip 56. The quench bath coolant can be maintained at a desired temperature, as required dependent on line speed, by heat-exchange unit 62 which removes heat from quench bath 58. Rapid-cooling of the polymeric coating through glass-transition temperature produces non-directional amorphous characteristics throughout the polymeric layers.

During continuing in-line travel, quench-bath coolant is removed by wringer rolls 63 of FIG. 3; and, each surface is dried at dryer 64. Cooled and dried polymeric-coated composite work product 65 travels through looper 66, under control of bridle roll unit 68, for recoiling at Station 70 for warehousing; or, can be directed by roll 72 to Station 74 for directing to end-usage fabrication.

Figure 4:
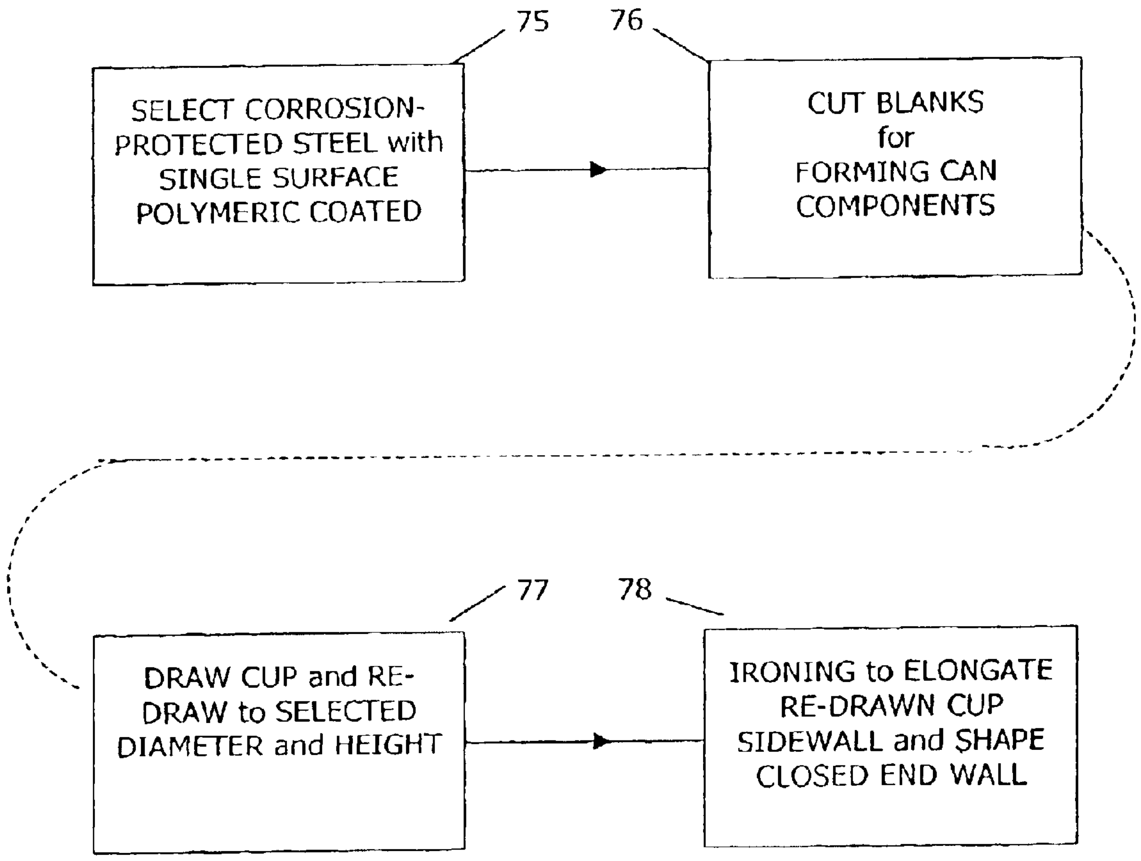
FIG. 4 is a diagrammatic presentation, with associated schematic cross-sectional views of can components in FIGS. 4(A), 4(B), and 4(C), for describing distinctive fabricating features of the invention.
Figure 4A:
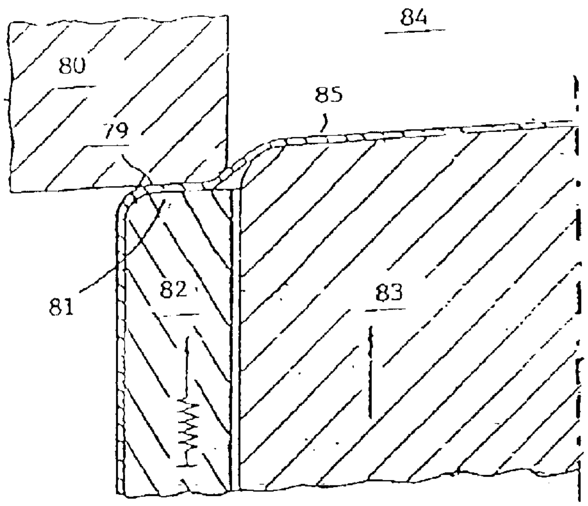
Figure 4B:
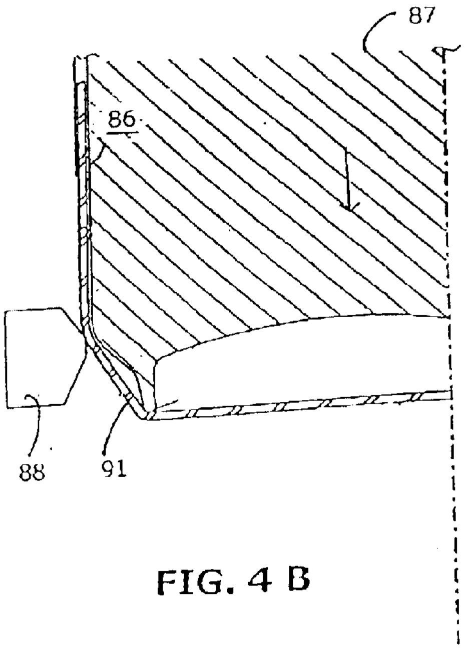
Figure 4C:
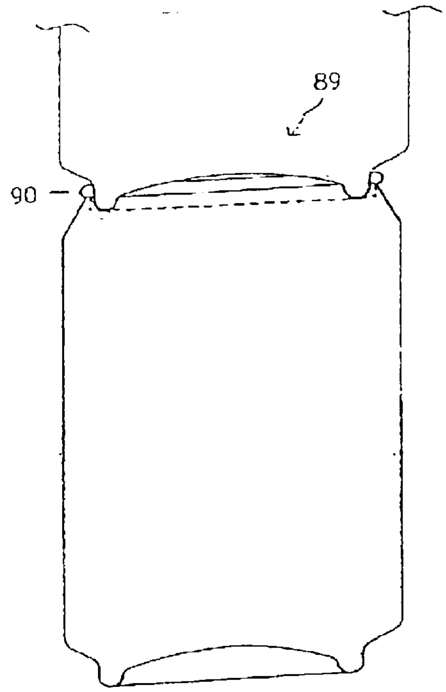

Methods and apparatus of FIGS. 2 and 3, respectively, prepare composite work-product for carrying out fabrication of end-usage product, as described in relation to FIGS. 4 and associated cross-sectional view of FIGS. 4(A), 4(B) and 4(C). At Station 75 in FIG. 4, a mild steel corrosion-protected substrate, with single-surface polymeric coated, and the remaining-opposed surface electrolytically tin plated, is selected for mechanical-action properties which function to enhance fabrication of selected end-usage product. The selected composite work product can be cut into blanks at Station 76 of FIG. 4 for forming can components; such as, end closures or one-piece can bodies.

For describing can body fabrication, a blank is cut and directed to Station 77 of FIG. 4 for draw and re-draw operations. Tension is regulated during draw and redraw operations at Station 77 as described for example: in co-owned U.S. Pat. No. 5,343,729, entitled "Fabricating One-piece Can Bodies with Controlled Side Wall Elongation"; or, as described in co-owned U.S. Pat. No. 5,590,558, entitled "Draw-processing of Can Bodies for Sanitary Can Packs"; U.S. Pat. No. 5,629,049 entitled "Draw-process Systems For Fabricating One-piece Can Bodies"; or, as described in co-owned U.S. Pat. No. 5,647,242 entitled "Fabricating One-piece Can Bodies with Controlled Side Wall Elongation"; each of which is included herein by reference.

The number of redraws can be selected at Station 77 to provide desired sidewall height and desired diameter for planned usage as one-piece can bodies. For example, desired unitary can body redraw height and redraw diameter for sanitary can packs are completed at Station 77, of FIG. 4. Sanitary packs are used for canning fruits, vegetables, soups, and the like in various sizes with diameters extending from about two inches to about five inches; and, with heights extending to about six inches. For example: dimensions for a 208×600 can as set forth in the "Dewey and Almy" Can Dimension Directory, published by of W. R. Grace Co., 7500 Grace Drive, Columbia, Md. 21044, are designated as two and eight sixteenths inch diameter with a height of six inches. The sidewall of a one-piece can body with a height of about three inches, and above, for sanitary can packs, is generally profiled for increased strength and, minimize sidewall denting. Also after hermetic sealing, sanitary can packs are generally heated in a retort oven to a temperature of about 200° F. to 250° F., and the sidewall profiling prevents implosion during cooling of the can and contents.

A draw-tension regulated redrawing operation of Station 77, is shown schematically in FIG. 4(A). Single-surface polymer pre-coated rigid mild steel work product, with the remaining surface electrolytically tin plated, is clamped between planar surface 79 of draw die 80, and planar surface 81 of clamping ring 82, as re-draw punch 83 moves upwardly, in the direction indicated, into cavity 84 of re-draw die 80. Can body 85 is being redrawn with the polymeric coating layers on its interior surface; and, with a selected electrolytic tin plating weight, as described above, on its exterior surface.

Fabricating an ironed-sidewall can body is carried out by selecting a redrawn cup, from Station 77 of FIG. 4, and directed to Station 78 of FIG. 4, for sidewall elongation by "ironing" and, also, for shaping the closed end wall. Such sidewall elongation and shaping of the closed end-wall are described in co-owned U.S. Pat. No. 6,305,210 B1, entitled "One-piece Can Bodies for Pressure Pack Beverage Cans," which is included herein by reference.

In the practice described in U.S. Pat. No. 6,305,210 B1, the can body is redrawn to a height approaching final height; and to a diameter, greater than final can body diameter, which provides added metal for strengthening the end wall during dome shaping of the closed end wall. Referring to FIG. 4(B) elongation of sidewall 86 by so-called "ironing", can be carried out as plunger 87 drives redrawn can body 85 [from FIG. 4(A)] through circular-configuration "ironing" rings of consecutively decreasing interior diameter; such a circular-configuration ring 88 is shown in cross-section, in FIG. 4(B).

As sidewall elongation is being completed, shaping of the closed end wall is initiated at the stage shown in FIG. 4(B). A dome-shape 89, as shown in FIG. 4(C), is formed in the closed end wall. The processing of FIGS. 4(B) and (C) is described in greater detail in the above referenced co-owned U.S. Pat. No. 6,305,210 B1. That is, forming dome-shape 89 in the closed end wall, after sidewall "ironing" elongation, helps to release the can body from plunger 87 (FIG. 4(*b*)). Such end wall shaping process also helps to provide increased sidewall thickness where needed; that is:

(i) for hermetically sealing of the open-end of the can body by means of and closure 90 of FIG. 4(C); and, also (ii) for providing increased closed-end strength where needed at the changing diameter portion 91 of FIG. 4(B); which interfits within an open end closure, such as 90 of FIG. 4(C) and, also, provides support for stacking of filled cans as shown in FIG. 4(C)

Enlarged cross-sectional view FIG. 5 and the further expanded cross-sectional views FIGS. 5(A) and 5(B) depict the two-polymeric layer embodiment of the invention. Flat-rolled mild steel substrate 90 (FIG. 5) is selected as described in relation to FIG. 1 Station 12, and FIG. 2 Station 24. In FIG. 5(A) and FIG. 5(B) each planar surface of substrate 92 includes initial corrosion-protection; as shown, respectively at 91 and 92. Selections for that type of corrosion-protection, shown in FIG. 5(A) and FIG. 5(B), are described in relation to FIG. 1; that is, a cathodic-dichromate passivating layer, or strike-coat electrolytic tin-plate, can be selected for sub-surface corrosion protection of the steel substrate.

A heavy-coat electrolytic tin plating 93 (FIG. 5(A)) comprises the exterior surface of a can component end-usage product. The surface which will comprise the interior of a can component is polymer coated, as described above in relation to FIGS. 2 and 3. A "tie" polymeric layer 94, and a "finish-surface" polymeric layer 95 are shown in cross-section FIG. 5(B). The polymer formulations for each such polymeric layer are set forth above in the descriptions of FIGS. 2 and 3.

The additional expanded cross-sectional views of FIG. 5(C) and FIG. 5(D) are for describing on embodiment in which each surface is directly plated with an electrolytic tin plating weight of about a quarter pound (0.25#) per base box. As shown in FIG. 5(C) on external tin-plated surface 104 is provided. And, as shown in FIG. 5(D), tin plated surface 106, is further coated with the two polymeric layers, as previously described in relation to FIG. 5(B); for the internal surface of an end-usage product. Specific thicknesses and other values are tabulated later herein for both the two and three polymeric layer embodiments.

Referring initially to enlarged cross-sectional view FIG. 6 and the further-expanded cross-sectional views of FIGS. 6(A) and 6(B), steel substrate 96 is selected as set forth in describing FIGS. 1 and 2; and, also, as the substrate shown in FIG. 5. That is, the steel substrate selected need not differ when selecting either a two polymeric layer or a three polymeric layer embodiment.

Steel substrate 96 as shown in expanded views of FIG. 6(A) and FIG. 6(B), includes sub-surface corrosion-protection coating 97 in FIG. 6(A), is the sub-surface corrosion protection for a can component exterior surface; and, corrosion protection sub-surface coating 98, is the corrosion protection for the can component interior surface. A sub-surface cathodic-dichromate coating can be selected at Station 16, FIG. 1; or, an electrolytic "strike" tin plating sub-surface corrosion-protection can be selected as described at Station 17, of FIG. 1.

A heavy-coat electrolytic tin plating 99, preferably up to about one pound and a quarter (1.25#) per base box of coated surface, is shown in FIG. 6(A), the latter is applied as described in relation to Station 19 of FIG. 1. That heavy-coat tin plated surface 99 compromises the exterior surface for a can component end-usage product of the invention.

In the remaining surface, as shown in FIG. 6(B) corrosion-protection coating 98; is coated with three polymeric layers; as described above in relation to FIGS. 2 and 3. "Tie" polymeric layer 100 first contacts corrosion-protection surface 98; followed by intermediate (bulk) layer 101, and followed by finish-surface layer 102.

An added tin plating embodiment, is shown in the additional expanded cross-sectional views of FIG. 6(C) and FIG. 6(D); both surfaces of steel substrate 96 can be directly plated with an electrolytic tin plating weight of about a quarter pound(0.25#) per base box; as described in relation to Station 18 of FIG. 2.

One surface, as shown in FIG. 6(C) presents, tin plated surface 105. And, the remaining surface, as shown at 107 in FIG. 6(D), includes that tin plating weight; and, also, further includes the three polymeric layers, as previously described in relation to FIG. 6(B)

DATA TABLE

| | | |
|---|---|---|
| I. | Mild Steel Substrate | about 60 to 115 pounds per base box |
| II. | Substrate Corrosion Protection | |
| | a) cathodic-dichromate (i) dip coat: | about 50 to about 250 micrograms per sq. ft. of surface area |
| | (ii) electrolytically-coated | about 250 to about 750 micrograms per sq. ft. of plated surface area |
| | b) "strike" or "barrier" tin plating | about .02 to about .05 pound per base box |
| III. | Electrolytically Tin Plate | |
| | a) Heavy-coat each surface | about .25 pound per base box |
| | b) Single-surface heavier coat | about .25 to about 1.25 pounds per base box |
| IV. | Polymeric Coating Layers | Total thickness about one mil (.001") |
| | a) first-contacting "bonding" layer | about .0002" |
| | b) intermediate layer (solely for three polymeric layer embodiment) | about .0006" |
| | c) "finished-surface" layer | |
| | i) for two polymeric layer embodiment | about .0008" |
| | ii) for three polymeric layer embodiment | about .0002" |

EQUIPMENT TABLE

| | EQUIPMENT | SUPPLIER |
|---|---|---|
| I. | Open Flame Burner(s) | Flynn Burner Corporation 425 Fifth Ave. (P.O. Box 431) New Rochelle, NY 10802 |
| II. | Corona Discharge Unit | Enercon Industries Corp. W140 N9572 Fountain Boulevard Menomonee Falls, WI 53052 |

-continued

EQUIPMENT TABLE

| | EQUIPMENT | SUPPLIER |
|---|---|---|
| III. | Extruder | Black Clawson Converting Machinery, LLC. 46 North First Street Fulton, NY 13069 |
| IV. | Supply for Thermoplastic Polymers | Basell Polyoleins USA, Inc. 2801 Centreville Road Wilmington, DE 19808 |

Specific methods, apparatus, products, and operational values have been described in order to enable one skilled in the art to make and use the invention. However, the above disclosure of flat-rolled sheet metal dimensional data, specific combinations of coatings, coating weights, polymeric materials, and continuous-line operation provides technical information enabling those skilled in the art to determine values other than those specifically set forth, while continuing to rely on the principles of the invention as taught by said disclosure. Therefore, in evaluating valid patent coverage for the disclosed subject matter, reference should be made to the scope and breadth of the appended claims; and, it is submitted, that the language of those claims should be construed in the light of the above disclosure.

What is claimed is:

1. Process for formulating thermoplastic polymers and combining with flat-rolled mild steel substrate for producing composite work product for fabricating rigid sheet metal can components, comprising A) providing elongated rigid flat-rolled mild steel continuous-strip presenting opposed substantially-planar surfaces, having:
   (i) a steel thickness gage in the range of about 0.006" to about 0.015", and
   (ii) corrosion-protection for each such opposed surface which includes electrolytic tin plating for at least one surface;

B) directing such strip for continuous-line travel at a selected line-speed in the direction of its length, presenting such opposed substantially-planar surfaces extending between elongated lateral edges of such strip;

C) pre-treating a single-surface of such strip, so as to enhance reception and retention of formulated thermoplastic polymers on such pre-treated surface, by:
   (i) selecting pre-treating steps from the group consisting of:
      (a) impinging an open flame for burning-off any debris from such single-surface, with the fuel/air ratio of such open-flame controlled so as to produce an oxidizing reaction by impingement on such surface;
      (b) corona-discharge ionizing of gaseous atmosphere contacting such single-surface, free of electric arcing with such surface, and
      (c) a combination of (a) and (b), in any sequence;

D) selecting thermoplastic polymers and formulating for melted thin-film extrusion deposition under pressure on such single-surface as plural polymeric layers:

E) selecting such polymeric layers from the group consisting of:
   (i) a two-polymeric layer embodiment, and
   (ii) a three-polymeric layer embodiment; each of which, comprises:
      (a) a tie polymeric layer which first-contacts such strip for bonding with such pre-treated single-surface, and
      (b) an externally-located finish-surface polymeric layer; with such three-polymeric layer embodiment further including:
   an intermediate-polymeric layer which is melted, extruded under pressure as a thin-film, and located between such first-contacting tie polymeric layer and with such finish-surface polymeric layer so as to bond with each;

F) directing such strip for travel in-line at substantially ambient temperature;

G) preparing such polymeric formulations for extrusion, under pressure, by:
   (i) establishing and maintaining such formulations in a temperature range including at least melt temperature for such thermoplastic polymers,
   (ii) simultaneously extruding such melted formulations under pressure, as thin-film distinct polymeric layers of a selected embodiment, extending across strip width, and
   (iii) extending such thin-film extrusion further so as to establish a polymeric overhang extending beyond each lateral strip edge;

H) solidifying such extruded polymeric layers, including
   (i) initiating heat-removal by contact with such ambient temperature strip as traveling in-line, and
   (ii) augmenting heat-removal by contact, of the polymeric coating on such strip and such polymeric overhang, with a temperature-modulating surface while such strip is traveling in-line, with heat removal of steps (i) and (ii):
   (iii) achieving solidification of such polymeric layers across strip width, and solidification of such polymeric overhang beyond each such lateral edge, enabling continuing-in-line travel of such polymeric coated strip independent of contact with such temperature-modulating surface.

I) trimming solidified polymeric overhang beyond each such lateral strip edge;

J) finish-treating polymeric layers of such selected embodiment, by raising temperature of such polymeric layers to at least melt temperature, while avoiding heating of such strip to melt temperature for such tin plating, and K) rapidly cooling such melted polymeric layers through glass-transition temperature, so as to establish:
   (i) amorphous non-directional characteristics in such polymeric layers of the selected embodiment, while also
   (ii) removing heat from such strip.

2. The process of claim 1, including:

(i) formulating thermoplastic polymers for such two polymeric layer embodiment, in which:
   (a) such strip-contacting tie layer for bonding with such strip, comprises:
   a maleic anhydride modified polypropylene (PP) layer, and
   (b) such finish-surface polymeric layer, comprises: polybutylene (PB); and (ii) formulating thermoplastic polymers for such intermediate polymeric layer of the three polymeric layer embodiment, to include:

a controlled percentage of polybutylene, with the remainder selected from the group consisting of:

(a) a homopolymer polypropylene, (b) an ethylene/PP random copolymer, and (c) a combination of (i) and (ii).

3. The process of claim 2, in which thermoplastic polymers for such finish-surface polymeric layer formulation provide self-lubricating properties for end-usage product fabrication, and, such formulation includes:

about five percent PB, with the remainder of such finish-surface layer being selected from the group consisting of:

(i) a homopolymer polypropylene (PP), (ii) an ethylene/PP random copolymer; and (iii) a combination of (i) and (ii).

4. The process of claim 3, in which such intermediate layer, of such three polymeric layer embodiment comprises (i) from about ten percent to about twenty-five percent polybutylene (PB), and, includes (ii) a selected percent of titanium oxide ($TiO_2$) so as to act as a coloring agent.

5. The process of claim 3 or 4, including:

(i) selecting initial corrosion-protection for opposed surfaces of such steel substrate, selected from the group consisting of (a) a strike-coat weight electrolytic tin plating, (b) a cathodic dichromatic passivation coating, and (c) a combination of (a) and (b).

6. The process of claim 5, further including:

adding an electrolytic tin plating, for such remaining surface opposite to the single-surface as pre-treated for polymeric coating, having a tin plating weight selected in a range above about a quarter pound (0.25#) per base box to about 1.25 pounds per base box of plated surface area.

7. The process of claim 3 or 4, including:

directly electrolytically tin plating each such steel substrate surface, by selecting an electrolytic tin plating weight of about a quarter pound (0.25#) per base box of plated surface.

8. The process of claim 6, including selecting matte-finish electrolytic tin plating.

9. The process of claim 7, including selecting matte-finish electrolytic tin plating for each such steel substrate surface.

10. Polymeric-coated rigid flat-rolled mild steel composite work product, manufactured in accordance with the process of claim 1.

11. Polymeric-coated rigid flat-rolled mild steel composite work product manufactured in accordance with claim 2.

12. Polymeric-coated rigid flat-rolled mild steel composite work product manufactured in accordance with the process of claim 6, for fabricating rigid sheet metal can components.

13. Polymeric-coated rigid flat-rolled mild steel composite can stock manufactured in accordance with the process of claim 8, for fabricating rigid sheet metal one-piece can bodies, selected from the group consisting of:

(i) redrawn can bodies, and (ii) drawn and sidewall ironed can bodies.

14. Polymeric-coated rigid flat-rolled mild steel composite can stock manufactured in accordance with the process of claim 9, for fabricating ironed-sidewall rigid sheet metal one-piece can bodies.

15. A rigid sheet-metal can component fabricated from polymeric coated rigid flat-rolled mild steel composite manufactured in accordance with the process of claim 2.

16. A one piece rigid can body fabricated from polymeric-coated rigid flat-rolled mild steel composite manufactured in accordance with the process of claim 8.

17. A drawn and ironed-sidewall rigid one-piece can body fabricated from polymeric-coated rigid flat-rolled mild steel manufactured in accordance with the process of claim 9.

* * * * *